United States Patent
Yeh

(10) Patent No.: US 7,459,000 B2
(45) Date of Patent: Dec. 2, 2008

(54) LOW TEMPERATURE REFORMING PROCESS FOR PRODUCTION OF HYDROGEN FROM METHANOL

(75) Inventor: Chuin-Tih Yeh, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 524 days.

(21) Appl. No.: 11/193,156

(22) Filed: Jul. 29, 2005

(65) Prior Publication Data

US 2006/0269469 A1    Nov. 30, 2006

(51) Int. Cl.
*C01B 3/32* (2006.01)
*C01B 3/24* (2006.01)

(52) U.S. Cl. .................. 48/198.7; 48/127.1; 48/214 A; 48/199 FM; 423/648.1

(58) Field of Classification Search .................. 48/127, 48/127.1, 214 A, 198.7, 199 FM; 502/330
See application file for complete search history.

(56) References Cited

U.S. PATENT DOCUMENTS

| | | | |
|---|---|---|---|
| 5,759,949 A | * | 6/1998 | Grigorova et al. .......... 502/330 |
| 6,165,633 A | * | 12/2000 | Negishi ....................... 429/17 |
| 2002/0012828 A1 | * | 1/2002 | Grigorova et al. ............. 429/40 |
| 2006/0128565 A1 | * | 6/2006 | Flytzani-Stephanopoulos et al. .. 502/439 |

FOREIGN PATENT DOCUMENTS

| WO | WO 97/45192 | * | 12/1997 |
|---|---|---|---|
| WO | WO 99/16546 | * | 4/1999 |

* cited by examiner

Primary Examiner—N. Bhat
(74) Attorney, Agent, or Firm—Thomas, Kayden, Horstemeyer & Risley

(57) ABSTRACT

A hydrogen production process with high hydrogen yield at a low temperature is described. First, an aqueous methanol solution with water/methanol molar ratio between about 0.75 and about 2.5 is pre-mixed with oxygen in an oxygen/methanol molar ratio not greater than about 0.5. The mixture is then directed to pass through an activated supported gold catalyst undergoing an oxidative steam reforming of methanol to generate a hydrogen-rich gas with CO content less than 1% at a low reaction temperature ($T_R$>150° C.). Gold particles on active supported gold catalysts have been dispersed to a size of 6 nm or less. The oxidative steam reforming of methanol may generate more than 2 moles of hydrogen for each mole of methanol consumed.

9 Claims, 1 Drawing Sheet

LOW TEMPERATURE REFORMING PROCESS FOR PRODUCTION OF HYDROGEN FROM METHANOL

RELATED APPLICATIONS

The present application is based on, and claims priority from, Taiwan Application Serial Number 94116946, filed May 24, 2005, the disclosure of which is hereby incorporated by reference herein in its entirety.

BACKGROUND

1. Field of Invention

The present invention relates to a method for producing hydrogen gas. More particularly, the present invention relates to a method of hydrogen gas production from reforming of methanol at low temperatures.

2. Description of Related Art

The fuel cell is a prosperous technology in progress. It can efficiently transform chemical energy in fuel into electricity in an environment-friendly manner. Amongst fuel cells under development, hydrogen fuel cell is preeminent because it can be operated at a low temperature of 200° C. or less. However, hydrogen is inconvenient to store and transport. These shortcomings can be technically overcome by using hydrocarbons as source outer primary fuel and transformed it into hydrogen-rich gas (HRG) on board of fuel cell application. HRG is a gas mixture with high hydrogen content and it is one of the fuels suitable for fuel cells.

Production of HRG from reforming of methanol has been widely studied because it is highly chemically active, abundant, and cheap. Many methanol reforming processes have been developed in literature. Early methods are "steam reforming of methanol" (SRM) and "partial oxidation of methanol" (POM):

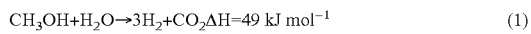

$$CH_3OH + H_2O \rightarrow 3H_2 + CO_2 \quad \Delta H = 49 \text{ kJ mol}^{-1} \quad (1)$$

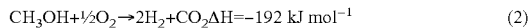

$$CH_3OH + \tfrac{1}{2}O_2 \rightarrow 2H_2 + CO_2 \quad \Delta H = -192 \text{ kJ mol}^{-1} \quad (2)$$

Reaction SRM has a high hydrogen yield (number of hydrogen molecule produced from each consumed methanol molecule) of $R_{H2}=3.0$. However, the endothermic reaction does not theoretically favor at low temperatures. According to Le Chatelier's Principle, SRM becomes efficient at high temperatures. Comparatively, exothermic POM is favored at lower temperatures and produces HRG with low CO contamination. However, a low hydrogen yield of $R_{H2}=2.0$ is produced.

A more advanced process is called "oxidative steam reforming of methanol" (OSRM). OSRM uses a mixture of water vapor and oxygen as oxidant. In other words, it is a combination of reactions 1 and 2 in an optional ratio. A negligible reaction heat may occur as the ratio is 3.9/1. On one hand a desirably high $R_{H2}$ (>2.0) may be generated by OSRM due to addition of steam, and on the other hand the CO content in HRG and the reaction temperature can be decreased due to the presence of oxygen.

There are many OSRM-related references. Some use supported copper catalysts such as $Cu/ZnO-Al_2O_3$ and $Cu/ZrO_2$, as disclosed in US published application 2002/0019324, Hozle et al., U.S. Pat. No. 6,576,217, Nojima et al., and WO published application 2004/083116, Schloglet et al., for example. Some use $Pd/CeO_2-ZrO_2$ catalyst, as disclosed in US published application 2001/0021469A1 and 2001/0016188 A1, Kanekim et al., or Pd—Cu/ZnO alloy catalyst, as disclosed in WO published patent 96/00186, Edwards et al. These catalysts require a reaction temperature of $T_R>200°$ C. to catalyze OSRM and the selectivity of CO (instead of the aimed $CO_2$) in product is high ($S_{co}>2$). CO is notorious for poisoning Pt catalyst, deactivating the catalyst and damaging the performance of the PEMFC. If copper catalyst dispersed on mixed zinc, aluminum and zirconium oxide is used, the CO selectivity may be decreased to $S_{co}<1\%$ (US 2005/0002858, published, Suzuki et al.), but a $T_R>200°$ C. remains required.

Table 1 shows the comparisons of different catalyst systems to the OSRM in other known references. It is observed that all of the catalyst systems require a temperature of $T_R>200°$ C. to effectively catalyze the OSRM.

TABLE 1

Comparison of different catalyst system to the OSRM

| catalyst system | x | w | $T_R$ (°C.) | $C_{MeOH}$ | $R_{H2}$ | $S_{CO}$ | sources |
|---|---|---|---|---|---|---|---|
| CuZnAlZr | 0.25 | 1.3 | 227 | 95 | 2.6 | 1 | Velu[1] |
| CuZnAl | 0.3 | 1.1 | 325 | 72.6 | 1.8 | 2.1 | Fierro[2] |
| CuZnAlZr | 0.3 | 1.3 | 227 | 80 | 2.8 | 0.7 | Velu[3] |
| CuZnAl | 0.47 | 1.43 | 227 | 100 | 2.45 | 0.19 | Shen[4] |
| CuZnZrCe | 0.25 | 1.6 | 227 | 78.5 | 2.9 | 0.58 | Velu[5] |
| CuZnAl | 0.125 | 0.75 | 277 | 80 | — | 2.6 | Geissler[6] |
| CuCoZnAl | 1.6 | 0.25 | 227 | 50 | 2.5 | 30 | Velu[7] |
| Pd/ZnO | 0.1 | 1.5 | 247 | 74 | — | 4 | Liu[8] |

Remarks: x stands for oxygen/methanol, and w is water/methanol.
$C_{MeOH} = [n(MeOH)_{in} - n(MeOH)_{out}]/n(MeOH)_{in}$
$S_{CO} = n(CO)_{out}/[n(CO)_{out} + n(CO_2)_{out}]$
$R_{H2} = n(H_2)_{out}/n(MeOH)_{in} - n(MeOH)_{out}]$
[1]Velu, S., Suzuki, K., and Osaki, T., Catal. Lett. 62, 159 (1999);
[2]Murcia-Mascaros, S., Navarro, R. M., Gomez-Sainero L. Costantino, U., Nocchetti, M., and Fierro, J. L. G., J. Catal. 198, 338 (2001);
[3]Velu, S., Suzuki, K., Kapoor, M. P., Ohashi, F., and Osaki, T., Appl. Catal. A: 213, 47 (2001);
[4]Shen, J-P., and Song C., Catal. Today 77, 89 (2002);
[5]Velu, S., and Suzuki, K., Topics in Catal. 22, 235 (2003);
[6]Geissler, K., Newson, E., Vogel, F., Truong, T., Hottinger, P., and Wokaun, A., Phys. Chem. Chem. Phys. 3, 189 (2001);
[7]Velu, S., and Suzuki, K., J. Phys. Chem. B 106, 12737 (2002);
[8]Liu, S., Takahashi, K., and Ayabe, M., Catal. Today 87, 247 (2003).

SUMMARY

In one aspect, the present invention provides a method for producing hydrogen from methanol at low temperatures. The method according to the present invention can effectively convert methanol and keeps a high hydrogen yield of $R_{H2}>2$, even when the reaction temperature is as low as $T_R=150°$ C.

In another aspect, the present invention provides a method for production of hydrogen rich gas at a low temperature for use in fuel cells. Supported gold catalyst is used for production of the hydrogen rich gas with low CO contamination.

In still another aspect, the present invention provides a method of oxidative steam reforming for methanol. Methanol is effectively converted, and each consumed methanol has a high hydrogen yield ($R_{H2}$).

Accordingly, a method for producing hydrogen rich gas with at a low temperature is provided. The method includes first mixing an aqueous methanol with oxygen. The water/methanol molar ratio (w) in the aqueous methanol is between about 0.75 to 2.5, and the oxygen/methanol molar ratio (x) is not greater than 0.5. The mixed vapor of the aqueous methanol and oxygen is then passed through a catalyst to catalyze an oxidative steam reforming of methanol to yield hydrogen rich gas with a CO selectivity of $S_{co}<1\%$ at a temperature of $T_R<200°$ C. The catalyst includes gold particles supported on zinc oxide and each mole of consumed methanol generates more than 2 moles of hydrogen gas.

According to one preferred embodiment of the present invention, the oxygen is, for example, air or pure oxygen. The catalyst is, for example, gold particles on a support of zinc oxide. The gold content in the catalyst is, for example, between 0.5 to 5.0% (w/w), and the particle size of the gold particles is not greater than 6.0 nm.

In addition, another method for producing hydrogen gas at a low temperature is provided. The method includes first mixing an aqueous methanol with oxygen. The water/methanol molar ratio in the aqueous methanol is between about 0.75 and 2.5, and the oxygen/methanol molar ratio is not greater than 0.5. The mixed vapor of the aqueous methanol and oxygen is then passed through a catalyst to catalyze an oxidative steam reforming of methanol to yield hydrogen gas with a $S_{co}$<1% at a $T_R$<200° C. The catalyst includes gold particles supported on a supporter.

According to another preferred embodiment of the present invention, the oxygen is, for example, air or pure oxygen. The catalyst is, for example, gold particles on a support of zinc oxide, zirconium oxide, a MCM molecular sieve, or a NaMor supporter. The gold particle content in the catalyst is, for example, between 0.5 and 5.0% (w/w), and the particle size of the gold particles is not greater than about 6.0 nm.

According to the above methods, the oxidative steam reforming of methanol may be performed under a temperature as low as 150° C., for a convenient integration with fuel cells operated at low temperatures. Moreover, each mole of consumed methanol generates more than two moles of hydrogen gas, which exceeds the theoretical hydrogen yield of POM (2.0). Most important of all, the CO content in the hydrogen gas produced from the low temperature method is not greater than 1%.

It is to be understood that both the foregoing general description and the following detailed description are examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
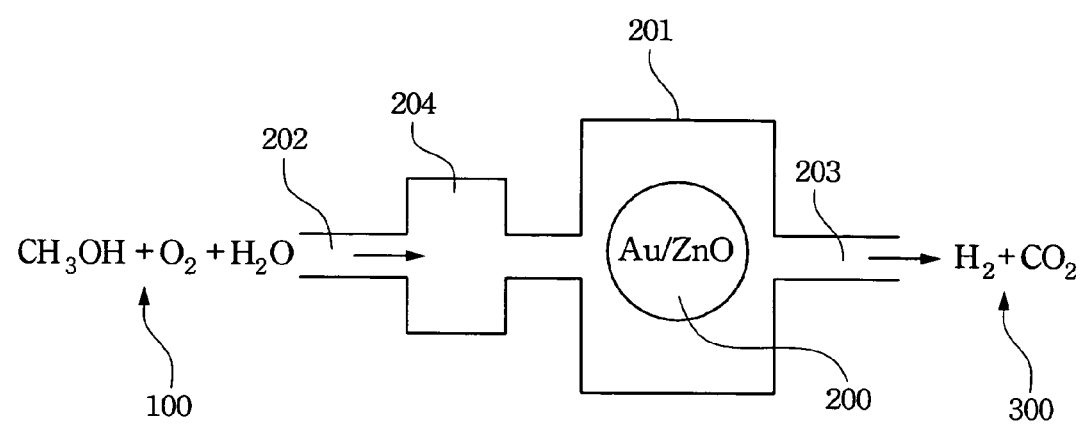
FIG. 1 is an illustrative flow diagram of the reactive system of the method of the present invention.

To have an ideal oxidative steam reforming of methanol, the following four attributes are necessary:

1. The conversion of methanol ($C_{MeOH}$) should be high: a high conversion rate saves the methanol feed.
2. Low reaction temperature ($T_R$): a low $T_R$ ($\leq$200° C.) is preferred to couple with the operation temperature of hydrogen fuel cells. A moderate reaction temperature permits a short start-up time for the reaction, a simple control system and a friendly working condition.
3. High yield ratio of hydrogen ($R_{H2}$, number of $H_2$ molecules produced from each converted methanol): the maximum $R_{H2}$ in OSRM is 3.0. A high $R_{H2}$ is pursued for OSRM.
4. Low selectivity of CO ($S_{co}$): HRG is contaminated by CO as a side product due to incomplete oxidation of methanol to $CO_2$. The CO contamination in HRG has to be stepwise reduced before fed into fuel cells. The CO reduction apparatus needs a large space and is costly. Consequently, a low $S_{co}$ in OSRM is greatly needed for OSRM.

The present invention utilizes an active gold catalyst for catalyzing oxidative steam reforming of methanol to obtain HRG. At a low reaction temperature of $T_R$=150° C., the present invention still maintains a high conversion of methanol ($C_{MeOH}$), a high yield ratio of hydrogen ($R_{H2}$), and a low selectivity of CO ($S_{co}$). Evenly dispersed tiny gold particles on suitable supporters exhibit great catalytic performance.

First, some abbreviations are defined as follows:

Conversion of methanol $C_{MeOH}$ is $[n(MeOH)_{in}-n(MeOH)_{out}]/n(MeOH)_{in}$, selectivity of CO ($S_{co}$)=$n(CO)_{out}/[n(CO)_{out}+n(CO2)_{out}]$, yield ratio of hydrogen ($R_{H2}$)=$n(H2)_{out}/[n(MeOH)_{in}-n(MeOH)_{out}]$, (in mole).

Preparation of Catalyst

Generally speaking, the supported catalyst of the present invention was prepared by deposition precipitation. Active catalyst support was made by depositing 1 M zinc nitrate solution with 1 M sodium hydroxide solution for deposition of zinc hydroxide. Obtained zinc hydroxide was then calcined at ambient air pressure and a temperature of about 300° C.

Au/ZnO catalyst was prepared from a solution suspended with active zinc oxide powder by the deposition precipitation method. After $HAuCl_4$ (aq) was introduced in drops into the zinc oxide suspended solution powders, 1 M sodium hydroxide solution is added to neutralize the suspension to pH=7. Under this circumstance, gold hydroxide is gradually deposited on the surface of the ZnO support. After stirring for 2 h, the suspension was filtered, washed, and dried at 100° C. to obtain a precursor of gold catalyst. A fresh gold catalyst is prepared by passing hydrogen gas through the precursor at 300° C. to reduce the precursor to gold particles.

The gold content of the catalyst prepared by the above-mentioned deposition precipitation is, for example, in the range of 0.5 to 6.0%, and preferably in the range of 1.0 to 5.0%. The particle size of gold ($d_{Au}\leq$5.0 nm) in gold catalysts, when examined with a transmission electron microscope (JEOL, JEM-2010), is fine and evenly dispersed on the surface of the support.

Reaction System of Oxidative Steam Reforming of Methanol and Method for Testing Catalitic Reaction Gold catalyst samples of 100 mg were tested with a fixed methanol flow rate of 1.2 ml/h in a fixed bed reactor. The molar ratio of the water to methanol (w) in reactant feeds was controlled by the composition of liquid feed in reservoir. The molar ratio of oxygen to methanol (x) in the feed was controlled by the flow rate of oxygen gas. The total flow rate of the feed was F=100 ml/min controlled by Ar as a carrier gas. The contact time of reaction was thus kept at around $W^{cat}/F$=1×10$^{-3}$ min·g/ml.

FIG. 1 schematically describes the fixed bed reactor used for OSRM tests in this invention. The reaction system includes reactants 100, catalyst 200, and products 300. Reactants 100 are methanol, water and oxygen gas. In a typical test, catalyst 200, gold particles supported on zinc oxide, is stuffed in reactor 201. Products 300 are mainly hydrogen gas and carbon dioxide. In the test, reactants 100 pass through inlet 202 and preheater 204, and then enter the reactor 210 to contact the catalyst 200 after being preheated to 120° C. Products 300 are collected at outlet 203. Catalyst 200 has been activated at 200° C. in hydrogen for 1 hr prior to use. The results with different conditions are listed below.

TABLE 2

| Exp. | Catalyst | $wt_{Au}$ % | x | w | Reaction Temp.(° C.) | $C_{MeOH}$(%) | $R_{H2}$ | $S_{CO}$ (%) |
|---|---|---|---|---|---|---|---|---|
| 1 | Au/ZnO | 4.0 | 0.5 | 0 | 150 | 50 | 1.4 | <1 |
| 2 | Au/ZnO | 4.0 | 0 | 1.0 | 400 | 40 | 2.8 | 20 |
| 3 | Au/ZnO | 4.0 | 0.12 | 1.0 | 150 | 50 | 2.4 | <1 |
| 4 | Au/ZnO | 4.0 | 0.25 | 1.0 | 150 | 95 | 2.5 | <1 |
| 5 | Au/ZnO | 4.0 | 0.25 | 1.5 | 200 | 93 | 2.4 | 1.0 |
| 6 | Au/ZnO | 4.0 | 0.25 | 0.75 | 200 | 92 | 2.2 | 1.0 |
| 7 | Au/ZnO | 4.0 | 0.50 | 1.0 | 200 | 98 | 2.1 | <1.0 |
| 8 | Au/ZnO | 2.0 | 0.25 | 2.5 | 250 | 92 | 2.6 | 1.0 |
| 9 | Au/ZnO | 0.5 | 0.50 | 1.0 | 300 | 74 | 1.6 | 2.5 |
| 10 | Au/MCM | 5.0 | 0.50 | 0 | 160 | 42 | 1.3 | 14 |
| 11 | Au/ZrO$_2$ | 1.0 | 0.50 | 1.0 | 250 | 54 | 2.0 | 3.0 |
| 12 | Au/NaMor | 1.0 | 0.50 | 1.0 | 200 | 43 | 2.0 | 5.0 |

$C_{MeOH} = [n(MeOH)_{in} - n(MeOH)_{out}]/n(MeOH)_{in}$
$S_{CO} = n(CO)_{out}/[n(MeOH)_{in} - n(MeOH)_{out}]$
$R_{H2} = n(H_2)_{out}/[n(MeOH)_{in} - n(MeOH)_{out}]$ Influence of Water on Oxidative Steam Reforming of Methanol Exp. 1 in Table 2 demonstrates that a methanol reforming reaction is performed in anhydrous conditions with 4 wt % Au/ZnO. According the previous mechanism, not only POM but also SRM is involved in Exp. 1. Although methanol can be significantly oxidized to HRG with negligible CO contamination ($S_{co}$<1%) at a temperature of 150° C., the yield of hydrogen is undesirably low ($R_{H2}$=1.4).

Influence of Oxygen on Oxidative Steam Reforming of Methanol

Exp. 2 indicates that methanol can be converted at a high temperature of 400° C. by SRM over the catalyst of 4 wt % Au/ZnO in the absence of oxygen. Unfortunately, a high $S_{co}$ (20%) was obtained.

Influence of Oxygen/Methanol Ratio on Oxidative Steam Reforming of Methanol

Exps. 3 and 4 reveal the influences of different ratios of x to $C_{MeOH}$, $R_{H2}$, and $S_{co}$ over a catalyst of 4 wt % Au/ZnO at a low $T_R$=150° C. and w=1.0.

Both $C_{MeOH}$, $R_{H2}$ rise with the increase of x, which probably means a proper x ratio may optimize the $C_{MeOH}$ and $R_{H2}$. In addition, $S_{co}$ is not greatly influenced by x and remains below 1%.

Influence of Different Supporters on Oxidative Steam Reforming of Methanol

Exps. 10 to 12 indicate influences of support of gold catalyst on the OSRM. It is observed that Au catalysts supported on ZrO$_2$ or NaMor are also active in catalyzing OSRM.

COMPARISONS

A comparison of Exps. 4 and 5 indicates that $C_{MeOH}$ slightly rises with the increase of temperature from 150° C. to 200° C. $S_{co}$ also keeps itself below 1% under this temperature change. $R_{H2}$ decreases slightly but remains over 2.0.

Comparison between Exps. 4 and 7 reveals that $C_{MeOH}$ rises with the increase of x when x is greater than 0.25, and $R_{H2}$ and $S_{co}$ decrease with $R_{H2}$ staying above 2.0. Presumably, a high extent of POM takes place on the rise of x.

Examination of the Exps. 5-7 indicates that the activity of the gold catalyst is not greatly influenced by the change of x and w. $R_{H2}$ may slightly decrease but remains above 2.0. Methanol conversion may exceed $C_{MeOH}$=98% and $S_{co}$ keeps itself as low as possible (<1%).

As far as the Table 2 is concerned, active gold catalyst is the key to the invention for producing hydrogen gas from the oxidative steam reforming of methanol. Even at a temperature as low as 150° C., the Au/ZnO catalyst of the present invention is still effective in catalyzing the oxidative steam reforming of methanol and generating hydrogen gas with low CO contamination and high yield. Given the above, the application of the present invention may be very influential in the petroleum industry, fuel cell technology, and hydrogen economics.

Although the present invention has been described in considerable detail with reference to certain preferred embodiments thereof, other embodiments are possible. Therefore, their spirit and scope of the appended claims should no be limited to the description of the preferred embodiments contained herein.

What is claimed is:

1. A method for producing hydrogen gas at a low temperature, comprising:
    mixing an aqueous methanol with oxygen, wherein a water/methanol molar ratio in the aqueous methanol is between about 0.75 and 2.5, and an oxygen/methanol molar ratio is not greater than 0.5; and
    passing the mixed vapor of the aqueous methanol and oxygen through a catalyst to catalyze an oxidative steam reformation of methanol to yield hydrogen gas with a CO content not greater than 1% at a temperature lower than about 200° C., and each mole of consumed methanol generates more than 2 moles of hydrogen gas, wherein the catalyst comprises gold particles supported on zinc oxide.

2. The method of claim 1, wherein an amount of gold particles in the catalyst is between about 0.5 and 6.0% (w/w).

3. The method of claim 1, wherein an amount of gold particles in the catalyst is between about 1.0 and 5.0% (w/w).

4. The method of claim 1, wherein a particle size of the gold particles is not greater than about 6.0 nm.

5. A method for producing hydrogen gas at a low temperature, comprising:
    mixing an aqueous methanol with oxygen, wherein a water/methanol molar ratio in the aqueous methanol is between about 0.75 and 2.5, and an oxygen/methanol molar ratio is not greater than about 0.5; and passing a mixed vapor comprising the aqueous methanol and oxygen through a catalyst to catalyze an oxidative steam reformation of methanol to yield hydrogen gas with a CO content not greater than about 1% at a temperature lower than about 200° C., wherein the catalyst comprises gold particles supported on an oxide support.

6. The method of claim 5, wherein an amount of gold particles in the catalyst is between about 0.5 to 6.0% (w/w).

7. The method of claim 5, wherein an amount of gold particles in the catalyst is between about 1.0 and 5.0% (w/w).

8. The method of claim 5, wherein the particle size of the gold particles is not greater than 6.0 nm.

9. The method of claim 5, wherein the oxide support is selected from the group consisting of zinc oxide, zirconium oxide and NaMor.

\* \* \* \* \*